US005149724A

United States Patent [19]

Fahey et al.

[11] Patent Number: 5,149,724

[45] Date of Patent: Sep. 22, 1992

[54] ANTI-STATIC AND ANTI-FOGGING COMPOSITIONS FOR USE IN POLYVINYL CHLORIDE AND POLYOLEFIN FILMS

[75] Inventors: Timothy E. Fahey; Julia A. Falter, both of Williamsport, Pa.

[73] Assignee: Lonza Inc., Fair Lawn, N.J.

[21] Appl. No.: 425,728

[22] Filed: Oct. 23, 1989

[51] Int. Cl.[5] .............................................. C08K 5/15

[52] U.S. Cl. ................................... 524/110; 524/317; 524/567; 524/910

[58] Field of Search ............... 524/110, 910, 317, 567, 524/582, 585

[56] References Cited

U.S. PATENT DOCUMENTS 3,950,289 4/1976 D'Amato et al. .................. 524/110

FOREIGN PATENT DOCUMENTS 59-226047 12/1984 Japan .

*Primary Examiner*—Joseph L. Schofer

*Assistant Examiner*—Mark D. Sweet

*Attorney, Agent, or Firm*—Darby & Darby

[57] ABSTRACT

The composition includes a polyglycerol monoester and an ethoxylated sorbitan ester incorporated into polyvinyl chloride or polyolefin thin films. The film composition has enhanced anti-static, anti-fogging and dynamic heat stability properties.

12 Claims, No Drawings

ANTI-STATIC AND ANTI-FOGGING COMPOSITIONS FOR USE IN POLYVINYL CHLORIDE AND POLYOLEFIN FILMS

FIELD OF THE INVENTION

This invention relates generally to anti-static and anti-fogging compositions for use in polyvinyl chloride and polyolefin films and, in particular, to a polyglycerol monooleate and ethoxylated sorbitan composition which provides improved anti-static, anti-fogging and thermal stability properties to polyvinyl chloride and polyolefin films.

BACKGROUND OF THE INVENTION

Polyvinyl chloride and polyolefin films are used to provide see-through plastic wraps for meat, produce and other food products. It is important that such films have good anti-static and anti-fogging properties as well as good thermal stability so that the packaged products appear attractive to a consumer.

Anti-static properties relate to the ability of the film to dissipate an electric charge and thereby prevent or control development of static electricity within the film. Films in which static charge has accumulated pick up dust and appear dirty. Accordingly, the appeal of a product packaged in such a film is diminished.

Anti-fogging properties relate to the ability of the film to prevent or dissipate condensation of water vapor in the form of small discrete droplets on the surface of the film. Fog formation causes the contents of a package on which the film is used to appear less visibly attractive and to have reduced food quality.

In addition to good anti-static and anti-fogging properties, a polyvinyl chloride or polyolefin film must also have good dynamic heat stability. Dynamic heat stability relates to the ability of the film to resist color degradation due to heat.

U.S. Pat. No. 3,479,308 issued to Gattenby, Jr., et al. on Nov. 18, 1969 shows a composition for providing anti-fogging and anti-tackifying properties to polymeric vinyl films. The composition includes a glycerol component such as a glycerol monooleate and a polyol component such as polyoxyethylene sorbitan monooleate. The films are said to have excellent anti-tackifying, anti-fogging and gas diffusion properties. However, the necessity for providing good anti-static and heat stability properties as well is not recognized.

U.S. Pat. No. 3,558,537 issued to Hecker et al. on Jan. 26, 1971 discloses a composition including a partial ester of polyglycerol with an unsaturated monocarboxylic acid for improving the anti-fogging properties of a polyvinyl chloride resin. The disadvantage of this patent disclosure is that the importance of providing improved anti-static properties is not taught or suggested.

SUMMARY OF THE INVENTION

A composition including a polyglycerol ester and an ethyoxylated sorbitan ester has been found to provide good anti-static, anti-fogging and dynamic heat stability properties in polyvinyl chloride and polyolefin films. All of these properties are maintained at lower loadings than necessary for conventional anti-fogging additives.

The polyglycerol oleates may be the mono-, di- or triester. The number of glyceryl groups may be from two to six. Suitable carboxylate compounds include those having from 12 to 22 carbon atoms, either saturated or having at least one unsaturated site. Examples of these materials are oleic, linoleic, stearic, palmitic, and lauric acid esters. The preferred material of the invention is triglycerol monooleate. With regard to the ethoxylated sorbitan esters, these must contain from 1 to 60, preferably from 10 to 30, oxyethylene groups, and desirably preferably 20. In addition to polyvinyl chloride films, the invention may be applied to polyolefins such as low density polyethylene, linear low density polyethylene and polypropylene. The weight ratio of the polyglycerol ester to ethoxylated sorbitan ester may range from 4:1 to 1:4.

Based on 100 parts of resin, from 0.5 to 2.0 parts, preferably 0.75 to 1.25 parts, of each of the two components should be added.

DETAILED DESCRIPTION OF THE PREFERRED EMBODIMENTS

The subject invention may be applied to a broad range of polyvinyl chloride homopolymers and copolymers. The term "polyvinyl chloride", as used in the instant invention includes polyvinyl chloride, chlorinated polyvinyl chloride, and comonomers with vinyl acetate, vinyl formate, alkyl vinyl ethers, ethylene, propylene, butylene, vinylidene chloride, alkyl acrylates and methacrylates, alkyl maleates and alkyl fumarates. Preferably, at least 80% of the copolymer is vinyl chloride.

The techniques for polymerizing polyvinyl chloride are well-known in the art. Generally, the polymers have number average molecular weights ranging from 15,000 to 60,000. Of particular interest are compositions used for the extrusion of films and sheets. Molecular weights ranging from 45,000 to 55,000 are typical.

Films and sheets can be prepared by extrusion or calendering. In extrusion of the films or sheets, the extruder melts the material and forces it through a slit die of the appropriate dimensions. The material is then taken off by chilled rolls and wound onto bobbins. In a blown film extrusion, the material is extruded through a tubular die and subsequently blown out into the desired thickness before cooling. This process is used to make plastic bags.

Calendering of films and sheets involves fluxing of the material on a series of heating rolls with varying nips between them. Once the material is fluxed, it can be removed from the rolls as a continuous sheet. Swimming pool liners and shower curtains are two common applications for calendered sheets. In any of these extrusion or calendering operations, it is important to retain initial color and to maximize clarity.

The composition of polyglycerol monoester and ethoxylated sorbitan ester provided in accordance with the invention is incorporated into the polyvinyl chloride or polyolefin thin film during film formation.

In the case of PVC, the powder is blended in a high intensity mixer prior to the extrusion of the film. In the case of the polyolefin, the same procedure may be used or, if desired, the ingredients may be melt-compounded in the extruder.

The polyglycerol monoester is preferably triglycerol monooleate which is used in amounts between 0.5 and 2.0 parts per hundred parts of resin, preferably from 0.75 to 1.25.

The ethyoxylated sorbitan ester is preferably polyoxyethylene sorbitan monooleate, preferably POE (20) sorbitan monooleate. The sorbitan ester is used in an amount between about 0.5 to 2.0, preferably from 0.75 to 1.5.

To obtain processable molding compositions, various additives may be added to the resin. These include stabilizers, plasticizers, processing aids, fillers and colorants. In some cases, UV stabilizers, flame retardants, fungicides and blowing agents are also added.

Stabilizers retard degradation reactions during processing due to the elevated temperatures generated and are well-known. Generally organometallic salts based on tin, lead, barium-cadmium, calcium and zinc are useful, including dibutyltinbeta-mercaptopropionate, dibutyltin maleate, barium, cadmium and/or lead stearate complexes. The stabilizers act primarily to neutralize the volatiles formed as decomposition products during processing of the PVC resins, particularly hydrogen chloride vapor. Thus, an amount of stabilizer must be added to be just sufficient to prevent hydrogen chloride evolution. In general, from about 1 to 3 percent by weight of the total molding composition of one or more of the stabilizers is employed.

Plasticizers are added to impart flexibility to the molded vinyl composition and to provide a lower melt viscosity to the mixture during blending. This reduces the internal friction during the molding process. Commonly employed plasticizers include phthalate, phosphate, adipate and azelate esters, as well as epoxidized soybean oil having a molecular weight of about 1000. Chlorinated paraffin waxes can also be used. The amount of plasticizer employed depends on the rigidity required in the final product and may be as high as 75% of the weight of resin.

Processing aids are added to increase the melt strength during processing and molding operations and to reduce the melt viscosity and elasticity of the molding composition. Commonly employed processing aids include styrene-acrylonitrile resins and methylmethacrylate copolymers such as polymethylmethacrylate resins. The amount of processing aid added is generally in the range of from 2 to 10% of the total molding composition.

EXAMPLE 1

Several polyvinyl chloride films having different additives were tested to determine their anti-fogging properties.

To prepare the compounded resin, a Henschel mixer, Model FM-10, is charged with PVC resin and mixed at 2300 rpm to 82° C. Stabilizer, plasticizer and epoxidized soybean oil are then added and mixed to 93° C. Anti-fog/anti-static agents are added and mixed to 113° C. Speed is reduced to 1800 rpm and the Henschel is cooled to a batch temperature of 71° C. before discharge.

The compounded resin contained 100 parts of a mass polymerized PVC resin, 1 part of a calcium-zinc stabilizer (Synthetic Products—Synpro 1566), 1 part of a phosphite (Synthetic Products—Synpro 241), 10 parts of epoxidized soybean oil (Interstab Chemicals—Plastoflex 2307), 35 parts of plasticizer (USS Chemicals—PX-238) and 0-2.5 parts of anti-fog/anti-static agents.

To prepare the film the compounded powder blend is extruded into pellets in a Brabender 0.75" single screw extruder equipped with a 3/1 compression ratio single stage screw and a $\frac{1}{8}$" strand die under the following conditions:

| | Temperature °C. | | | | |
|---|---|---|---|---|---|
| Zone | 1 | 2 | 3 | Die | Screw Speed, rpm |
| | 165 | 175 | 180 | 17 | 80 |

The pellets are then extruded into film in a Brabender 0.75" single screw extruder equipped with a 3/1 compression ratio single stage screw and a 4" wide film die. Films are pulled through chilled, polished rolls onto a take-up bobbin. The conditions in the extruder are as follows:

| | Temperature °C. | | | | |
|---|---|---|---|---|---|
| Zone | 1 | 2 | 3 | Die | Screw Speed, rpm |
| | 165 | 175 | 180 | 175 | 80 |

Two tests are employed. In the first test, performed at room temperature, a sample of extruded film is placed over the mouth of a 4 oz. jar containing 60 ml of tap water at 50° C. The time for the foggy surface of the film to clear is recorded. The test is discontinued at 30 minutes.

In the second test, a sample of extruded film is placed over the mouth of a 4 oz. jar containing 60 ml of tap water at 2°-5° C. The jars are then placed in a refrigerator. The time for the fog to appear and then disappear is noted. The condensate is evaluated at 20 minutes, 2 hours and 24 hours.

TABLE 1

POLYVINYL CHLORIDE FOOD WRAP FILM
ANTI-FOG TESTING AT 2-5° C.

| ADDITIVE | TOTAL LOADING (PHR) | CLEAR TIME | ANTI-FOG RESULTS 20 MINUTES | 2 HOURS |
|---|---|---|---|---|
| NONE | — | | FOGGY/LIGHT DROPS | FOGGY/HEAVY DROPS |
| 50/50 BLEND OF | 1.0 | 35 MIN-2 HRS | SL FOGGY/MED DROPS | CLEAR/HEAVY DROPS |
| TRIGLYCEROL MONOOLEATE + | 1.5 | 10-20 MIN | CLEAR/MED DROPS | CLEAR/HEAVY DROPS |
| POLYOXYETHYLENE (20) | 2.0 | 0 SECONDS | CLEAR | CLEAR |
| SORBITAN MONOOLEATE | 2.5 | 0 SECONDS | CLEAR | CLEAR |
| 50/50 BLEND OF | 2.5 | 10-20 MIN | CLEAR | CLEAR |
| DIGLYCEROL MONOSOYATE + | | | | |
| POLYOXYLETHYLENE (20) | | | | |
| SORBITAN MONOOLEATE | | | | |
| 50/50 BLEND OF | 1.0 | 18-24 HRS | FOGGY/LIGHT DROPS | FOGGY/MED DROPS |
| GLYCEROL MONOOLEATE + | 1.5 | 20-35 MIN | SL FOGGY/MED DROPS | CLEAR/HEAVY DROPS |
| POLYOXYETHYLENE (20) | 2.0 | 10-20 MIN | CLEAR/MED DROPS | CLEAR/HEAVY DROPS |
| SORBITAN MONOOLEATE | 2.5 | 10-20 MIN | CLEAR/MED DROPS | CLEAR/HEAVY DROPS |
| 50/50 BLEND OF | 2.5 | 20 MIN-2 HRS | SL FOGGY | CLEAR/LIGHT DROPS |
| SOBITAN MONOOLEATE + | | | | |

TABLE 1-continued

| POLYVINYL CHLORIDE FOOD WRAP FILM ANTI-FOG TESTING AT 2-5° C. | | | | |
|---|---|---|---|---|
| | TOTAL | CLEAR | ANTI-FOG RESULTS | |
| ADDITIVE | LOADING (PHR) | TIME | 20 MINUTES | 2 HOURS |
| POLYOXYETHYLENE (20) SORBITAN MONOOLEATE ETHOXYLATED NONYLPHENOL | 3.0 | 20 MIN-2 HRS | SL FOGGY | CLEAR/LIGHT DROPS |

As can be seen, the polyvinyl chloride films containing one of the polyglycerol monooleates and the POE (20) sorbitan monooleate cleared immediately when subjected to refrigerated water at a temperature between about 2° and 5° C. for periods of 20 minutes and 2 hours.

EXAMPLE 2

The same films as used in Example 1 were subjected to a test to measure static decay. The static decay time is the time required for an applied charge of 5,000 volts to decay to 10% of the applied voltage. Samples were conditioned at 50% relative humidity and 70° F. for 1, 7, 14 and 30 days as shown. The results were obtained using an Electrotech Systems Static Decay Meter and are shown in the following Table 2:

TABLE 2

| POLYVINYL CHLORIDE FOOD WRAP FILM STATIC DECAY MEASUREMENTS | | | | | |
|---|---|---|---|---|---|
| | TOTAL LOADING | STATIC DECAY TIMES (SECONDS) | | | |
| ADDITIVE | (PHR) | 1 DAY | 7 DAYS | 14 DAYS | 30 DAYS |
| NONE | — | 106.6 | 87.2 | 70.5 | 29.1 |
| 50/50 BLEND OF | 1.0 | 3.5 | 2.9 | 1.8 | 1.0 |
| TRIGLYCEROL MONOOLEATE + | 1.5 | 0.8 | <0.5 | <0.5 | <0.5 |
| POLYOXYETHYLENE (20) | 2.0 | 0.6 | <0.5 | <0.5 | <0.5 |
| SORBITAN MONOOLEATE | 2.5 | <0.5 | <0.5 | <0.5 | <0.5 |
| 50/50 BLEND OF DIGLYCEROL MONOSOYATE + POLYOXYETHYLENE (20) SORBITAN MONOOLEATE | 2.5 | <0.5 | <0.5 | <0.5 | <0.5 |
| 50/50 BLEND OF | 1.0 | 20.1 | 14.5 | 11.7 | 10.1 |
| GLYCEROL MONOOLEATE + | 1.5 | 18.2 | 12.4 | 11.8 | 9.3 |
| POLYOXYETHYLENE (20) | 2.0 | 14.7 | 10.0 | 8.4 | 7.4 |
| SORBITAN MONOOLEATE | 2.5 | 11.0 | 5.7 | 3.2 | 2.9 |
| 50/50 BLEND OF SORBITAN MONOOLEATE + POLYOXYETHYLENE (20) SORBITAN MONOOLEATE | 2.5 | | | | 4.6 |
| ETHOXYLATED NONYLPHENOL | 3.0 | | | | 3.3 |

The results show a dramatic improvement in static decay rate when polyglycerol monooleates are used in a 50-50 blend with ethyoxylated sorbitan monooleate. The compositions of the invention give an efficient anti-static system because static dissipation properties are developed in a shorter period of time and at lower addition levels than is observed in prior art systems.

EXAMPLE 3

To test dynamic stability, a Brabender Plasticorder, Model EPL-V3302, equipped with a No. 6 roller head, roller blades and a quick loading chute, is allowed to equilibrate at 195° C. for 15 minutes. The blades are rotated at a speed of 90 rpm and 55.0 gms of the PVC is introduced into the mixing bowl through the quick loading chute within 20 seconds. The quick loading chute is removed one minute after fusion. Two minutes after fusion, the rotors are stopped, a sample is removed from the bowl with a warm spatula, and the rotors restarted immediately (sampling is completed in a maximum of 5 seconds). The hot sample is molded into a one-half inch button with a hand mold press. Excess is trimmed with scissors and returned to the bowl. Sampling is repeated periodically. Torque is recorded for each sample. Degradation is taken as an increase of 100 meter-grams in torque.

The dynamic heat stability of the polyvinyl chloride films are shown in Table 3.

TABLE 3

| POLYVINYL CHLORIDE FOOD WRAP FILM DYNAMIC HEAT STABILITY | | |
|---|---|---|
| ADDITIVE | TOTAL LOADING (PHR) | DYNAMIC STABILITY TIME (MIN) |
| NONE | — | 17.7 |
| 50/50 BLEND OF TRIGLYCEROL MONOOLEATE + POLYOXYETHYLENE (20) SORBITAN MONOOLEATE | 2.5 | 43.8 |
| 50/50 BLEND OF DIGLYCEROL MONOSOYATE + POLYOXYETHYLENE (20) SORBITAN MONOOLEATE | 2.5 | 39.8 |
| 50/50 BLEND OF GLYCEROL MONOOLEATE + POLYOXYETHYLENE (20) SORBITAN MONOOLEATE | 2.5 | 37.5 |
| 50/50 BLEND OF SORBITAN MONOOLEATE + POLYOXYETHYLENE (20) SORBITAN MONOOLEATE | 2.5 | 37.9 |
| ETHOXYLATED NONYLPHENOL | 3.0 | 35.5 |

As can be seen, the combination of triglycerol monooleate and an ethoxylated sorbitan ester imparts substantially improved thermal stability properties to polyvinyl chloride films.

In conclusion, it has been established that the compositions of the invention reduce the time necessary to clear a fog created by warm water, eliminate the formation of fog on a film exposed to refrigerated water and dissipate static in a shorter period of time. All of these functions are performed at lower loadings than required for conventional anti-fog/anti-static additives. In addition, this composition imparts improved dynamic heat stability properties compared to conventional additives.

What is claimed is:

1. A resin composition which comprises an admixture of a polyvinyl chloride containing from 0.5 to 2.0 parts per hundred parts of resin of a polyglycerol ester and from 0.5 to 2.0 parts per hundred parts of resin of an ethoxylated sorbitan ester.

2. The resin composition of claim 1, wherein the polyglycerol ester and the ethoxylated sorbitan ester are esters of saturated or unsaturated carboxylic acids containing from 12 to 22 carbon atoms per molecule.

3. The resin composition of claim 2, wherein the carboxylic acid is oleic, linoleic, stearic, palmitic or lauric acid.

4. The resin composition of claim 2, wherein the esters are mono-, di- or triesters.

5. The resin composition of claim 2, wherein the polyglycerol ester contains from 2 to 6 glyceryl groups.

6. A polymeric film having improved anti-static and anti-fogging properties which comprises a thin extruded film containing a polyvinyl chloride having blended therewith from 0.5 to 2 parts per hundred parts of resin of a polyglycerol ester and from 0.5 to 2.0 parts per hundred parts of resin of an ethoxylated sorbitan ester.

7. A polymeric composition containing polyvinyl chloride and a polyglycerol monooleate and a polyoxyethylene sorbitan ester.

8. The polymeric composition of claim 5, wherein the composition contains 0.5 to 2.0 parts per 100 parts of polyvinyl chloride resin of each of the polyglycerol monooleate and the polyoxyethylene sorbitan ester having from 10 to 30 oxyethylene groups per molecule.

9. The polymeric film of claim 6, wherein the polyglycerol ester and the ethoxylated sorbitan ester are esters of saturated or unsaturated carboxylic acids containing from 12 to 22 carbon atoms per molecule.

10. The polymeric film of claim 6, wherein the carboxylic acid is oleic, linoleic, stearic, palmitic or lauric acid.

11. The polymeric film of claim 6, wherein the esters are mono-, di- or triesters.

12. A composition for imparting improved properties to polymeric materials which comprises an admixture containing a polyglycerol ester and an ethoxylated sorbitan ester in a weight ratio of 4:1 to 1:4.

* * * * *